US009619587B2

(12) United States Patent
Griffith et al.

(10) Patent No.: US 9,619,587 B2
(45) Date of Patent: Apr. 11, 2017

(54) DECOMPOSITION OF 3D GEOMETRY INTO DEVELOPABLE SURFACE PATCHES AND 2D CUT PATTERNS

(71) Applicant: AUTODESK, Inc., San Rafael, CA (US)

(72) Inventors: Saul Griffith, San Francisco, CA (US); Martin Wicke, San Francisco, CA (US); Keith Pasko, San Francisco, CA (US); Geoffrey Irving, San Francisco, CA (US); Sam Calisch, San Francisco, CA (US); Tucker Gilman, San Francisco, CA (US); Daniel Benoit, Alameda, CA (US); Jonathan Bachrach, Berkeley, CA (US)

(73) Assignee: AUTODESK, INC., San Rafael, CA (US)

( * ) Notice: Subject to any disclaimer, the term of this patent is extended or adjusted under 35 U.S.C. 154(b) by 925 days.

(21) Appl. No.: 13/859,051

(22) Filed: Apr. 9, 2013

(65) Prior Publication Data

US 2013/0297058 A1 Nov. 7, 2013

Related U.S. Application Data

(60) Provisional application No. 61/621,940, filed on Apr. 9, 2012.

(51) Int. Cl.
*G06F 17/50* (2006.01)

(52) U.S. Cl.
CPC .......... *G06F 17/50* (2013.01); *G06F 2217/42* (2013.01)

(58) Field of Classification Search
CPC .. G06F 17/50; G06F 2217/42; G06F 17/5009; G06F 2217/12; B29C 67/0088

(Continued)

(56) References Cited

U.S. PATENT DOCUMENTS 5,448,687 A * 9/1995 Hoogerhyde ........... G06T 17/20
                                                345/423
6,819,966 B1 * 11/2004 Haeberli ................. G06T 19/00
                                                345/419

(Continued)

OTHER PUBLICATIONS

Julius, Dan Natan. "Developable surface processing methods for three-dimensional meshes." PhD diss., The University of British Columbia, 2006.*

(Continued)

*Primary Examiner* — Aniss Chad
(74) *Attorney, Agent, or Firm* — Artegis Law Group, LLP

(57) ABSTRACT

Embodiments disclosed herein provide techniques for decomposing 3D geometry into developable surface patches and cut patterns. In one embodiment, a decomposition application receives a triangulated 3D surface as input and determines approximately developable surface patches from the 3D surface using a variant of k-means clustering. Such approximately developable surface patches may have undesirable jagged boundaries, which the decomposition application may eliminate by generating a data structure separate from the mesh that contains patch boundaries and optimizing the patch boundaries or, alternatively, remeshing the mesh such that patch boundaries fall on mesh edges. The decomposition application may then flatten the patches into truly developable surfaces by re-triangulating the patches as ruled surfaces. The decomposition application may further flatten the ruled surfaces into 2D shapes and lay those shapes out on virtual sheets of material. A person, or machinery, may cut out those shapes from physical sheets of material based on the layout.

24 Claims, 7 Drawing Sheets

(58) Field of Classification Search
USPC .............................................................. 703/1
See application file for complete search history.

(56) References Cited

U.S. PATENT DOCUMENTS

| | | | | |
|---|---|---|---|---|
| 8,405,659 B2* | 3/2013 | Lakshmanan | ...... | G06K 9/00214 345/419 |
| 8,411,090 B2* | 4/2013 | Wang | ....................... | G06T 19/00 345/427 |
| 8,648,855 B2* | 2/2014 | Pedersen | .................. | G06T 17/20 345/419 |
| 8,665,267 B2* | 3/2014 | Joshi | ........................ | G06T 17/20 345/420 |
| 9,135,750 B2* | 9/2015 | Schmidt | .................. | G06T 15/00 |

OTHER PUBLICATIONS

Massarwi, Fady, Craig Gotsman, and Gershon Elber. "Papercraft models using generalized cylinders." In Computer Graphics and Applications, 2007. PG'07. 15th Pacific Conference on, pp. 148-157. IEEE, 2007.*

Pottmann, Helmut, Alexander Schiftner, Pengbo Bo, Heinz Schmiedhofer, Wenping Wang, Niccolo Baldassini, and Johannes Wallner. "Freeform surfaces from single curved panels." ACM Transactions on Graphics (TOG) 27, No. 3 (2008): 76.*

* cited by examiner

2

DECOMPOSITION OF 3D GEOMETRY INTO DEVELOPABLE SURFACE PATCHES AND 2D CUT PATTERNS

CROSS-REFERENCE TO RELATED APPLICATION

This application claims benefit of U.S. Provisional Patent Application Ser. No. 61/621,940 filed Apr. 9, 2012, which is incorporated herein by reference in its entirety.

BACKGROUND OF THE INVENTION

Field of the Invention

The present invention generally relates to computer software. More specifically, the present invention relates to techniques for decomposing three-dimensional (3D) geometry into developable surface patches and two-dimensional (2D) cut patterns.

Description of the Related Art

A number of sheet materials used to manufacture objects strongly resist stretching and shearing, but not bending. Such materials include sheet metal, textiles, and sheets of wood, each of which is typically easy to mass-produce and cut into shapes using, e.g., stamping, water jet, or laser cutters. Use of such materials may be cost-effective and preferable to more expensive molded or machined parts. However, each part, once cut to shape, can only be (approximately) isometrically deformed, as the properties of the materials allow bending, but not in-plane stretching or shearing in the final configuration. It is easily verifiable that the class of shapes such parts are deformable into is a subclass of "developable" surfaces, i.e., surfaces with zero Gaussian curvature, or equivalently, those surfaces that have only one (and perhaps no) non-zero principal curvature at each point. Examples of such developable surfaces include a plane and a cone, whereas a sphere is an example of a non-developable surface.

Given a 3D shape that is to be produced using the sheet materials just discussed, it is desirable to identify patches on the surface of the 3D shape that are developable, or approximately developable, so that the patches may be built using an appropriately shaped piece of the sheet material.

SUMMARY OF THE INVENTION

One embodiment sets forth a method for decomposing three-dimensional (3D) geometry into developable surface patches. The method includes receiving the 3D geometry growing surface patches from faces in the 3D geometry. Growing the surface patches may include performing the following steps until stabilization criteria are met: (1) selecting one or more seed faces, from the faces in the 3D geometry, as initializations of the surface patches; and (2) up to a distance threshold, iteratively adding faces to the surface patches, where, at each iteration, a face with minimum distance to a patch proxy is added to a patch associated with the patch proxy, the patch proxy including an axis and an opening angle.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
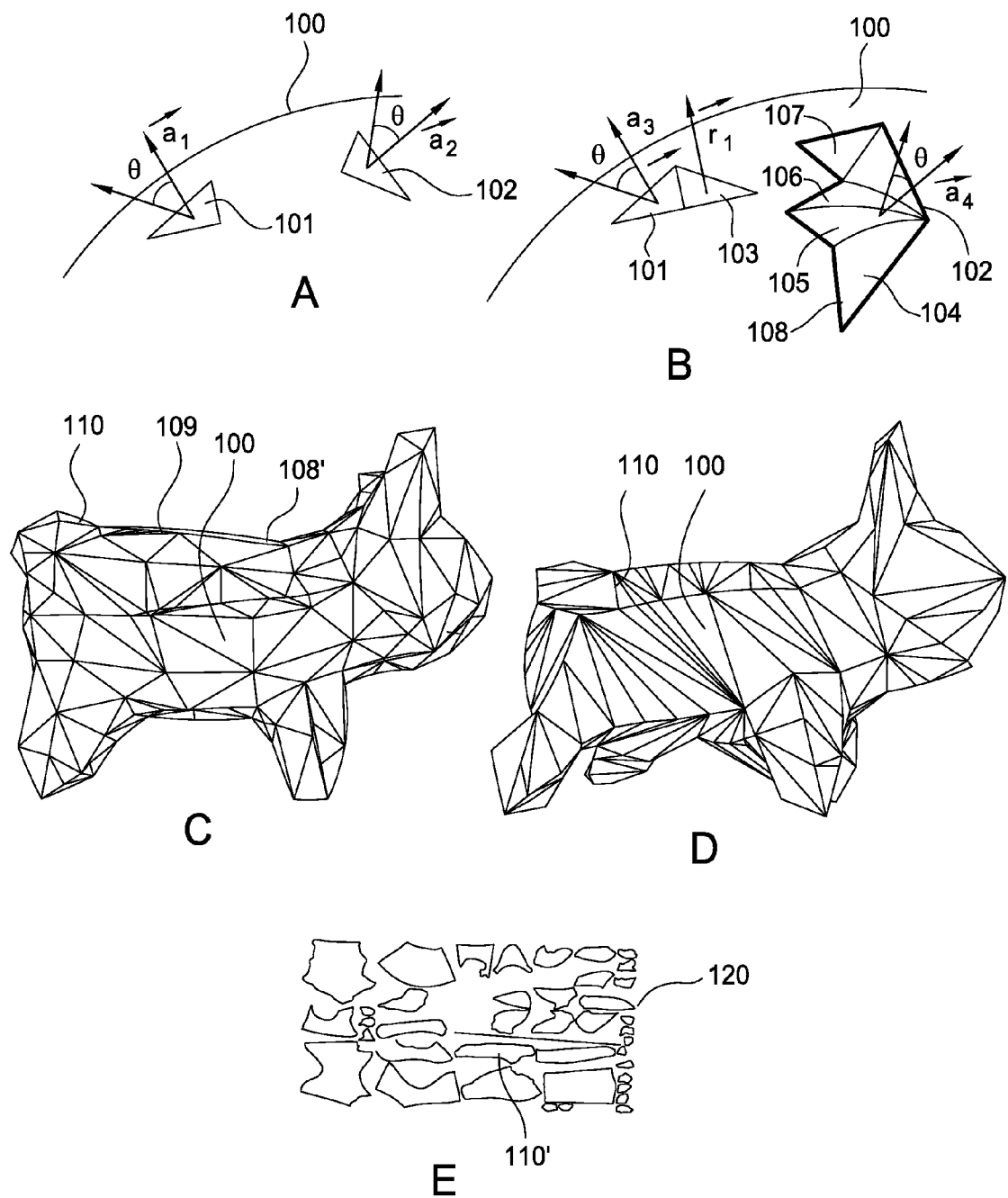
FIG. 1 illustrates an approach for decomposing a 3D geometry into developable surface patches which are flattened into a cut pattern, according to an embodiment of the invention.

Embodiments disclosed herein provide techniques for decomposing 3D geometry into developable surface patches and cut patterns. In one embodiment, a decomposition application receives a triangulated 3D surface as input and determines approximately developable surface patches from the 3D surface using a variant of k-means clustering. Beginning with seed triangles, patches are iteratively grown by adding the face with minimum distance to any patch to that patch which has the minimum distance to the face, until no face is less than a threshold distance from its closest patch. As used herein, a face is a closed set of edges, such as a triangle. The decomposition application may also merge adjacent patches. Then, if significant surface area is not assigned to any patch, the decomposition application chooses new seeds that are as far from the current patches' boundaries as possible, and iteratively grows new patches from the new seeds.

Approximately developable surface patches may have undesirable jagged boundaries. In one embodiment, referred to herein as "on-mesh optimization," the decomposition application may reduce jagged boundaries by generating a data structure separate from the mesh that contains patch boundaries and optimizing patch boundaries to reduce jagged boundaries. More specifically, the data structure may represent the boundaries as a set of points connected with springs, and the decomposition application may optimize an energy by moving boundary points on the 3D surface, and remeshing the mesh to ensure that all boundary points are vertices on the mesh. In an alternative embodiment, referred to herein as "in-mesh optimization," the decomposition application may remesh the mesh such that patch boundaries fall on mesh edges. In such a case, the decomposition application may compute an energy gradient for each of a plurality of contour points, move the contour point in the direction of the negative energy gradient, and find new intersections between the mesh edges and the moved contour, until convergence. Here, points on the contour may be constrained to lie either on a mesh edge or a mesh vertex.

Once approximately developable patches are determined, the decomposition application may then flatten the patches into truly developable surfaces by re-triangulating the patches as ruled surfaces. As used herein, a ruled surface is a surface which can be swept out by moving a line in space. The decomposition application may further flatten the ruled surfaces into 2D shapes and lay those shapes out on virtual sheets of material. A person, or machinery, may then cut out those shapes from physical sheets of material based on the layout of shapes generated by the decomposition application.

Note, users may also intervene in the process of determining approximately developable surfaces, optimizing patch boundaries, flattening patches into truly developable surfaces, flattening the developable surfaces into 2D shapes, and laying those shapes on virtual sheets of material, among others. For example, a user may specify seed locations, and the decomposition application may iteratively grow patches starting from the specified seed locations.

FIG. 1 illustrates an approach for decomposing a 3D geometry into developable surface patches which are flattened into a cut pattern, according to an embodiment. As shown in panel A, a decomposition application (not shown) computes approximately developable surfaces from 3D geometry 100, beginning from seed triangle faces 101, 102, from which patches are grown. For example, a given number of seed faces may be randomly chosen for 3D geometry 100. Illustratively, seed faces 101, 102, which are taken as the initial patches, have proxies $(\vec{a}_1, \theta)$ and $(\vec{a}_2, \theta)$, where $\vec{a}_1$ and $\vec{a}_2$ are fixed axis vectors and $\theta$ is an opening angle from the axis vectors $\vec{a}_1$ and $\vec{a}_2$. Each proxy represents the axis and opening angle of cones. As discussed in greater detail below, faces whose normals have dot product with a proxy axis that are close to the cosine of the opening angles may be added to the patch having the proxy. In particular, patches may be iteratively grown by adding the face with minimum distance, in terms of the difference between the dot product of the face's normal and a proxy axis with the cosine of the opening angle, to any patch to that patch, until no face is less than a threshold distance from its closest patch.

Panel B shows two patches which have been grown. A proxy may be fit to any given set of faces (e.g., the faces of the patch including triangles 101 and 103) by finding $(\vec{a}, \theta)$ that minimizes a fitting error. Illustratively, the proxies $(\vec{a}_3, \theta)$ and $(\vec{a}_4, \theta)$ have been fit to the patches including triangles 101, 103 and triangles 102, 104-107, respectively. Additional triangles may be added to the patches based on the proxies, as discussed. Illustratively, the patch including triangles 102, 104-107 has a jagged boundary 108. Such jagged boundaries may be unaesthetic. In one embodiment, the decomposition application may reduce such jagged boundaries by generating a data structure separate from the mesh that contains patch boundaries and optimizing the patch boundaries. The data structure may represent the boundaries as a set of points connected with springs, and the decomposition application may optimize an energy by moving boundary points on the 3D surface, and remeshing the mesh to ensure that all boundary points are vertices on the mesh. In an alternative embodiment, the decomposition application may remesh the mesh such that patch boundaries fall on mesh edges. In such a case, the decomposition application may compute an energy gradient for each of a plurality of contour points, move the contour point in the direction of a negative energy gradient, and find new intersections between the mesh edges and the moved contour, until convergence.

Panel C illustrates the result of the reduction of jagged boundaries. As shown, patch 110 has patches whose boundaries are relatively short and straight. Note, however, that vertices (e.g., vertex 109) occur within the boundary 108' of the patch 110. Such interior vertices may cause patches to not be developable. To flatten the patches into truly developable surfaces, the decomposition application may remove interior vertices and re-triangulate the patches as ruled surfaces, i.e., surfaces which can be swept out by moving a line in space.

Panel D illustrates the result of such an operation. As shown, vertex 109 and other interior vertices are removed from patch 110, and patch 110 has been re-triangulated as a ruled surface. Panel E shows the patches after the decomposition application flattens them into 2D shapes and lays those shapes out on a virtual sheet of material. The flattening may be performed by unfolding the dihedral angles at all edges to 0°. Additionally, joinery may be added to the pieces. As used herein, "joinery" refers to a structure which permits one or more pieces to be joined together when the pieces are assembled. Given the layout 120, a person, or machinery, may cut out the shapes from physical sheets of material based on the layout 120.

Figure 2:
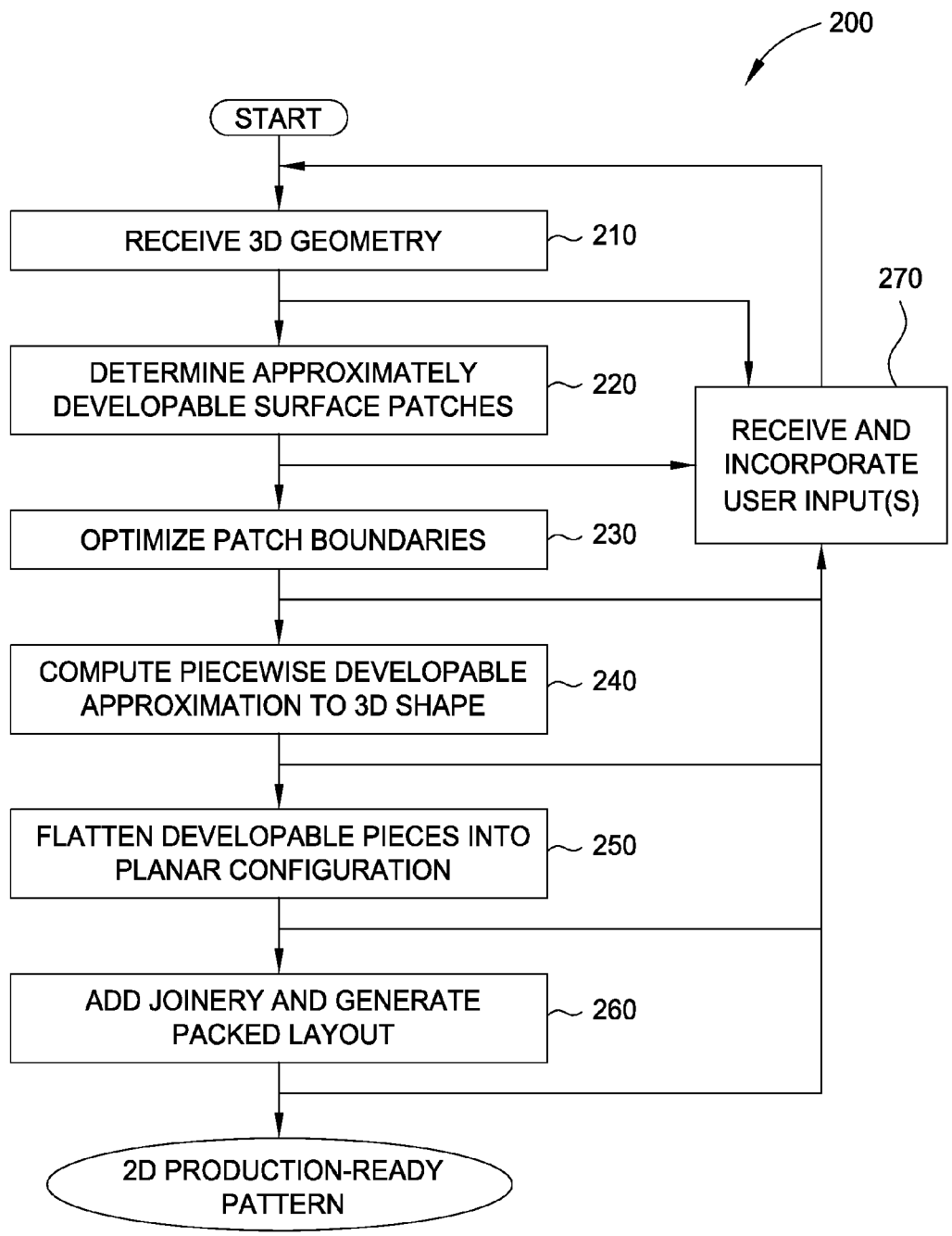
FIG. 2 illustrates a method for decomposing 3D geometry into a 2D production-ready pattern, according to an embodiment of the invention.

FIG. 2 illustrates a method 200 for decomposing 3D geometry into a 2D production-ready pattern, according to an embodiment. As shown, the method begins at step 210, where a decomposition application receives 3D geometry, which may be a triangulated 3D surface. At step 220, the decomposition application determines approximately developable surface patches from the received 3D geometry. In one embodiment, the approximately developable surface patches may be determined using a variant of k-means clustering. More specifically, the decomposition application may grow a number of contiguous and approximately developable surface patches, as discussed in greater detail below with respect to FIG. 3.

At step 230, the decomposition application optimizes patch boundaries. Patches defined by sets of triangles on a triangulated surface may have very jagged boundaries. Such jagged boundaries may be undesirable in textiles where patch boundaries become seams, and also in other materials where short and straight boundaries are more desirable. In one embodiment, the decomposition application generates a data structure separate from the mesh that contains patch boundaries and optimizes those patch boundaries to reduce jagged boundaries. This approach is referred to herein as "on-mesh" optimization, and is discussed in greater detail below with respect to FIG. 4A. In an alternative embodiment, the decomposition application remeshes the mesh such that patch boundaries fall on mesh edges, referred to herein as "in-mesh" optimization and discussed in greater detail below with respect to FIG. 4B.

At step 240, the decomposition application computes a piecewise developable approximation to the 3D shape. In one embodiment, the decomposition application may flatten the patches determined at steps 220-230 into truly developable surfaces by re-triangulating the patches as ruled surfaces, as discussed in greater detail below with respect to FIG. 5.

At step 250, the decomposition application flattens the developable pieces into a planar configuration. Such flattening may be performed by unfolding the dihedral angles at all edges to 0°, which is well-known. Note, the resulting 2D shape may be self-intersecting, in which case the decomposition application may split the shape along the shortest edge that removes the self-intersection.

At step 260, the decomposition application adds joinery to the flattened developable pieces and generates a packed layout. Example joinery includes seam allowances, rivet holes, tabs, and the like. After joinery is added to 2D shapes, such pieces are laid out in a "packed layout" on a virtual representation of a material. Any feasible packing algorithm may be used to generate the packed layout, and if sheets of the material are of limited size, the 2D shapes may be divided up to fit onto separate sheets.

At step 270, the decomposition application receives and incorporates user input. As shown, the user may intervene to modify the results of any of steps 210-260. For example, the user may override determinations made by the decomposition application for aesthetic or other purposes. As another example, the user may guide the decomposition application by, e.g., selecting seed locations for growing approximately developable patches. In one embodiment, the decomposition application may display a graphic user interface (UI) of intermediate and final results of the decomposition, and permit the user to go to any stage of the decomposition and fine-tune patches, boundaries between patches, etc.

Figure 3:
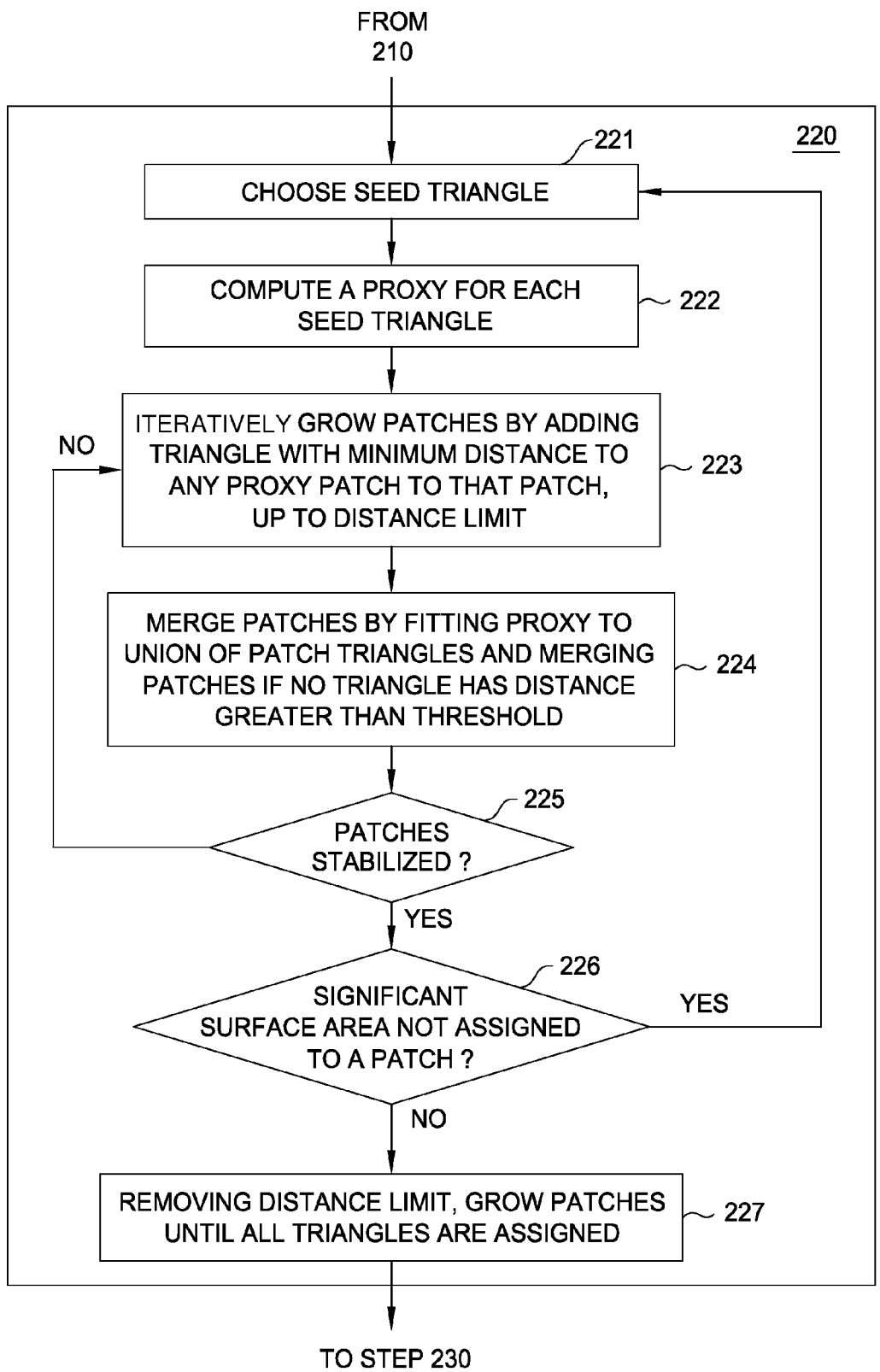
FIG. 3 illustrates one of the steps shown in FIG. 2, according to an embodiment of the invention.

FIG. 3 illustrates one of the steps shown in FIG. 2, according to an embodiment. At step 221, the decomposition application chooses one or more seed faces, each of which becomes a patch. In one embodiment, the seed faces may initially be chosen at random. For example, the decomposition application may randomly choose a given number (e.g., five) of seeds.

At step 222, the decomposition application computes a proxy axis for each patch. Let the proxy of a patch be ($\vec{a}$, $\theta$), where $\vec{a}$ is a fixed axis vector and $\theta$ is an opening angle from the axis vector $\vec{a}$. If the distance $\gamma$ between a face with normal $\vec{n}$ and a path represented by its proxy is defined as $$\gamma(\vec{n}, \vec{a}, \theta) = |\arccos(\vec{n} \cdot \vec{a}) - \theta|, \quad (1)$$

then given a set of faces with areas $A_i$ and normals $\vec{n}_i$, a proxy may be fit to the set by finding ($\vec{a}$, $\theta$) that minimizes a fitting error $$E = \Sigma_i A_i \gamma(\vec{n}_i, \vec{a}_i, \theta) \quad (2)$$

In one embodiment, the decomposition application may fit proxies to sets of faces using a Newton method with line search to obtain minimizers. For example, the Newton method may include iterations at 80 equidistance points on $S^2 \times [0, 2\pi]$. Of course, other nonlinear optimization methods may be used instead, such as Simplex, Broyden-Fletcher-Goldfarb-Shanno, or Power iterations.

In other embodiments, the decomposition application may use a different definition of distance and/or proxy. Any suitable metric may be used, such as flattenability after a new face is added, defined in terms of either maximum stress when the patch is deformed into a planar configuration, given material parameters, or maximum strain.

At step 223, the decomposition application iteratively grows the patches by adding, at each iteration, a face with minimum distance to any proxy patch to that patch, up to a distance threshold. For example, the proxy for each patch may be computed, as discussed above, using the normal of the seed face $\vec{n}$ and $\theta = 1$. Then, the patches may be iteratively grown by computing the distances from neighboring faces and adding a neighboring face to a patch to which it best fits, i.e., has the minimum distance to the proxy of the patch. In so doing, the patches are grown as developable surfaces of approximately constant slope, i.e., those whose face normals have a constant dot product c with axis vector $\vec{a}$. This ensures the parts fit on a cone and are thus at least approximately developable. The decomposition application may grow patches until no face has a minimum distance to any patch that is lower than a given distance threshold $\gamma_{max}$, which in one embodiment may be a user-specified threshold.

At step 224, the decomposition application merges patches by fitting a proxy to a union of patch faces and merging patches if no face has distance greater than the threshold $\gamma_{max}$ to the proxy. In one embodiment, the proxy may be determined by minimizing the fitting error of equation (2). The distance between such a proxy and each of the faces of the two patches may then be determined according to equation (1), and the patches merged if no distance is greater than the threshold $\gamma_{max}$.

At step 225, the decomposition application determines whether the patches have stabilized. As used herein, "stabilized" refers to a state in which only a small fraction of face area is newly assigned to a patch, or assigned to a different patch than in the last iteration. For example, the decomposition application may determine if the patches have stabilized based on whether less than 5% of the total face area of the 3D geometry is newly added to a patch, or has changed patch assignment, compared to the last iteration.

At step 226, the decomposition application determines whether significant surface area of the 3D geometry is not assigned to a patch. Here, significant surface area may refer to a percentage (e.g., 0.5%) of the surface area of the 3D geometry. If such is the case, the method 200 returns to step 221, where the decomposition application chooses additional seed faces from which to grow additional patches. In one embodiment, the decomposition application may choose, for each patch, a new seed that is as far as possible away from any of the current patches' boundaries and not yet in any patch. The decomposition application may then restart the growing process beginning with such seeds.

If the decomposition application determines that there is not a significant surface area that remains to be assigned to a patch, then, at step 226, the decomposition application removes the distance threshold $\gamma_{max}$ and grows patches until all faces are assigned to a patch. Although such assignments may introduce some error because faces are assigned to patches without regard to the distance threshold, the error may be small given that an insignificant area of the 3D geometry is assigned in this way.

Although finding approximately developable patches is discussed above as an automated technique, some embodiments may permit users to intervene. Such user interventions may include, e.g., changing the value of the distance threshold $\gamma_{max}$, specifying or modifying the seed locations and proxy axes and angles, copying patches from one location to another by manually or semi-automatically selecting and automatically rigidly aligning parts and then copying the seeds and proxies from the source part to the target part, and the like. Here, copying patches from one location to another may be used to enforce approximate symmetry or mirror symmetries. Modifying proxy axes may affect the preferred curvature directions in the patches, changing the most common directions of boundaries between the patches.

Figure 4A:
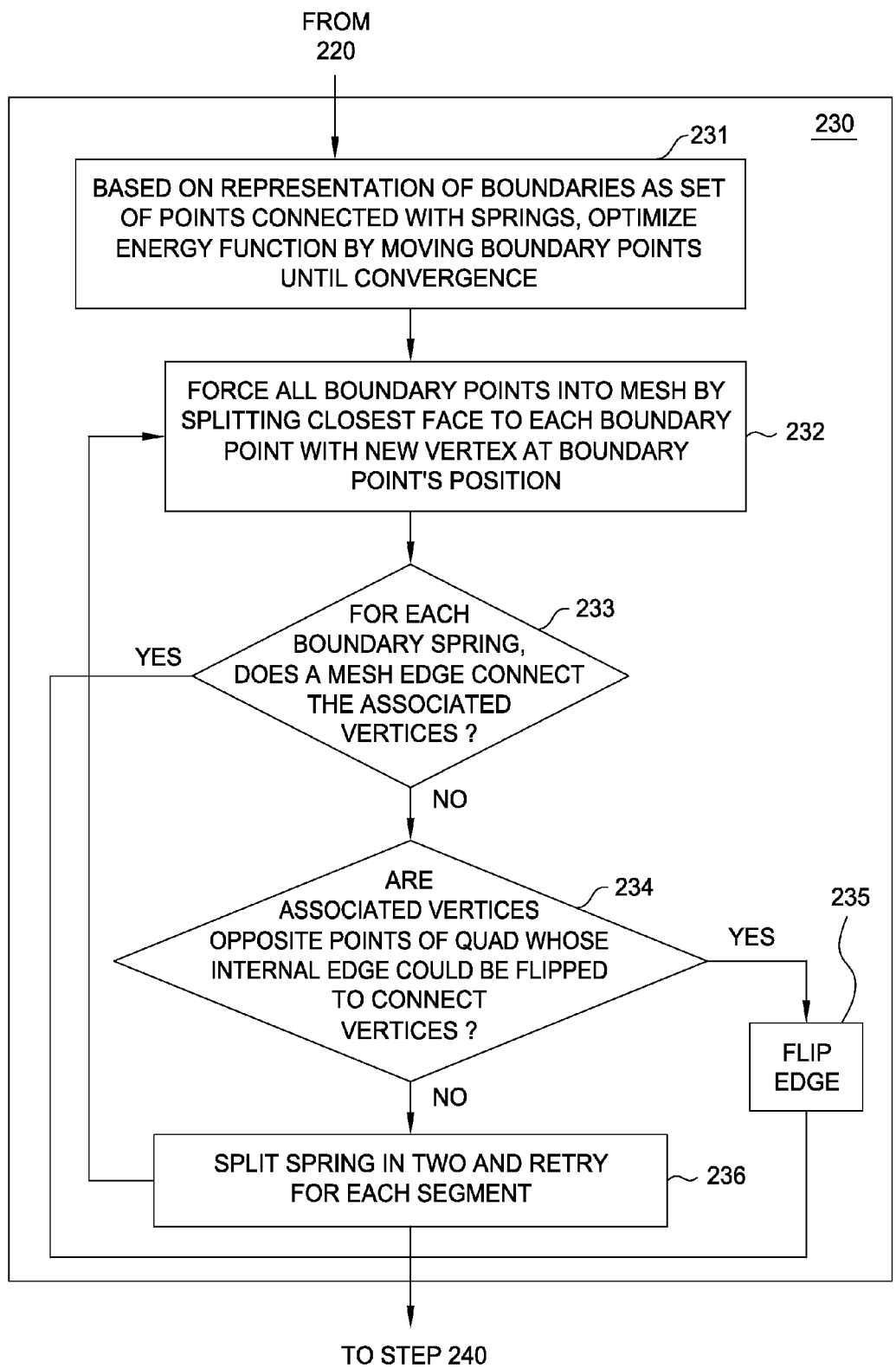
FIG. 4A illustrates another one of the steps shown in FIG. 2, according to an embodiment of the invention.

FIG. 4A illustrates another one of the steps shown in FIG. 2, according to an embodiment. The approach of FIG. 4A is referred to herein as "on-mesh optimizing," as a data structure external to the mesh is used to represent boundaries as a set of points connected with springs. Each spring tries to minimize its length while each point is constrained to lie on the mesh. There may be other energy terms influencing the movement of points, such as an energy attracting points to areas of high curvature, or forces specified by a user. The user may also add other constraints, such as fixing certain points so that those points cannot move.

At step 231, the decomposition application iteratively optimizes an energy function by moving boundary points, until convergence, based on the external data structure representation of boundaries as a set of points connected with springs. In one embodiment, the energy being optimized may be of the form $$E_{total} = l(C)^2 + E(C), \quad (3)$$

where $l(C)^2$ is a length term and $E(C)$ is an energy term which represents other energies such as an energy attracting points to areas of high curvature, forces specified by a user, and the like. For example, energies may be added to $E(C)$ which are proportional to the curvature of the 3D geometry such that boundaries between patches are moved to areas of high curvature. Doing so may give visually appealing results.

In a further embodiment, the decomposition application may simplify and speed up the iterative optimization by setting each point to its local minimum of the energy. If only the length energy term $l(C)^2$ is present (i.e., no additional energy terms $E(C)$ are considered), then this corresponds to computing the average of the point's neighbors (i.e., points to which the point is connected to with springs), and projecting such an average position to the closest point on the mesh. This projection may then be used as the new position for that point. Repeating this process quickly leads to convergence, and this process has the advantage of being unconditionally stable, so long as the process of finding the local minimum is stable, and the projection is well-behaved.

Note, the boundaries may move on the surface of the mesh (without affecting the tessellation) as points are moved. As a result, the mesh may need to be remeshed to ensure that all boundary points are vertices in the mesh, and that all springs are along mesh edges. After the energy minimization has converged, steps 232-236 may be performed to remesh the mesh. At step 232, the decomposition application forces all boundary points into the mesh by splitting a closest face to each boundary point with a new vertex at the boundary point's position. The decomposition application may further keep track of which mesh vertices are associated with which boundary points.

At step 233, the decomposition application determines, for each boundary spring, whether a mesh edge connects the vertices associated with the boundary spring. If no mesh edge connects the vertices associated with a given boundary spring, then at step 234, the decomposition application determines if the vertices are opposite points of a quad whose internal edges could be flipped to connect the vertices. If such is the case, then at step 235, the decomposition application flips the edges. If, however, the vertices are not opposite points of a quad whose internal edges can be flipped to connect the vertices, then at step 236, the decomposition application splits the spring into two springs and retries steps 232-235 for each resulting spring. This process eventually leads to all springs being represented by edges in the mesh.

Figure 4B:
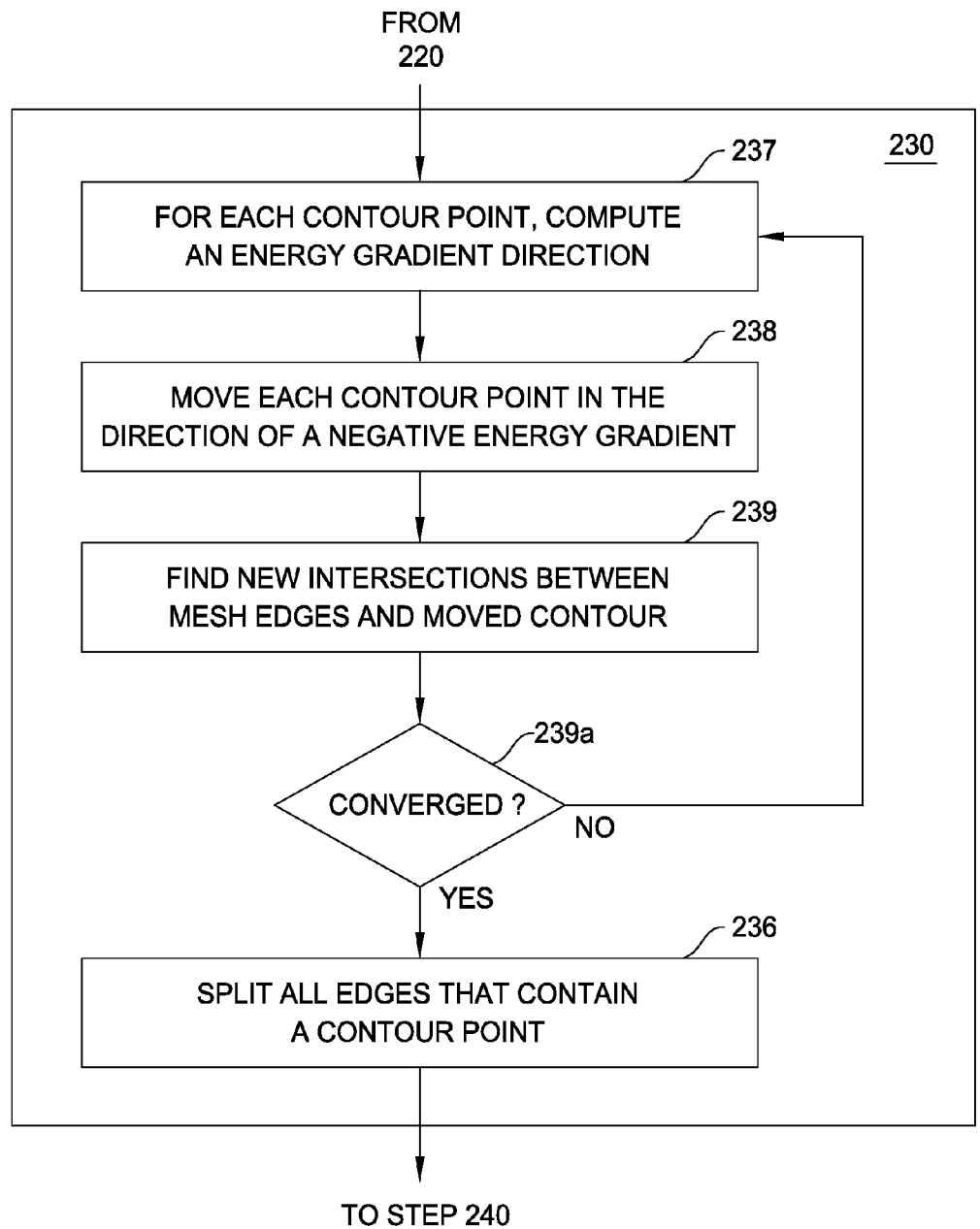
FIG. 4B, illustrates the step depicted in 4A, according to an alternative embodiment of the invention.

FIG. 4B, illustrates step 230 depicted in FIG. 2, according to an alternative embodiment. The approach of FIG. 4B is referred to herein as "in-mesh optimization," as no external data structure is used. In in-mesh optimization, mesh edges may be treated as a chain of springs, free to move along the mesh and subject to external forces, and the decomposition application may attempt to minimize the lengths of the edges, as well as an energy function defined on the mesh. At step 237, the decomposition application computes an energy gradient direction for each point of a contour which is piecewise linear, with each point on the contour being either on a mesh edge or a mesh vertex. Note that the contour may have bifurcation points where more than two patches meet, and, initially, all contour points are on the mesh vertices that are on patch boundaries. Let the total energy of a contour C be defined as $$E_{total} = l(C)^2 + E(C). \quad (4)$$

The gradient of this energy may be computed for each point on the contour.

At step 238, the decomposition application moves each contour point in the direction of a negative energy gradient. How far points are moved may be a function of a global time step. However, the decomposition application may move points less than one triangle in each time step such that the gradient direction can be reliably projected onto the pair of triangles around an edge, or the triangle fan around a vertex. If a contour point would move outside such an area, the decomposition application may clamp its velocity such that it remains inside and on the boundary of a valid area.

Note, only minimizing the length of the curve will shrink some patches and destroy the assignment of faces to patches. To ensure boundaries do not stray from patches that the boundaries are supposed to separate, the decomposition application may grow all patches while allowing for overlap such that each face is assigned to patches to which it would be allowed be part of. In one embodiment, the allowed patch set for an edge may be all patches of two incident faces, and the allowed patch set for an edge may be a union of all patches of all incident faces. When the decomposition application computes a gradient, it may check whether the direction of the gradient would take the contour point onto a face whose patch set does not include the contour point's current patch set. If such is the case, the decomposition application does not move that contour point. This is akin to using a non-smooth energy function which is 0 whenever the patch set contains the original patches, and ∞ otherwise.

At step 239, the decomposition application finds new intersections between mesh edges and moved contours. Then, if the decomposition application determines at step 239a that the contours have not converged, the method 200 returns to step 237, where the decomposition application computes an energy gradient direction for each contour point. If, on the other hand, the decomposition application determines at step 239a that the contours have converged, then at step 239b, the decomposition application splits all edges that include a contour point. Doing so ensures that all contour edges are also edges of the mesh. Here, the decomposition application may further remove patches altogether if any patches overlap with one or more other patches to a degree that exceeds a given threshold.

Although in-mesh optimization and on-mesh optimization are discussed above as automated techniques, some embodiments may permit users to intervene by, e.g., adding or removing boundaries, moving boundaries on the mesh arbitrarily, and the like. Such user interventions may aid in achieving, e.g., artistic goals such as hiding textile seams. In one embodiment, the user specified changes may be incorporated into the energy term $E(C)$ of equations 2 and 3 to enforce the changes as constraints. For example, when the user draws preferred boundaries onto the shape, those boundaries be represented as an energy proportional to the geodesic distance to the closest point on the drawn curve for each point on the surface. As another example, the user may mark areas that should be free of boundaries, and such areas may be represented by energies inversely proportional to the geodesic distance to point(s) in such areas. Of course, the user may also specify any other arbitrary energy to include in E(C). For example, the user may add a straightness energy, penalizing curved contours.

In a further embodiment, the number of sample points on contours may be increased by splitting contour edges that are long (e.g., exceed a threshold length) and collapsing contour edges that are short (e.g., below a threshold length). Doing so may lead to smoother patch boundaries.

Figure 5:
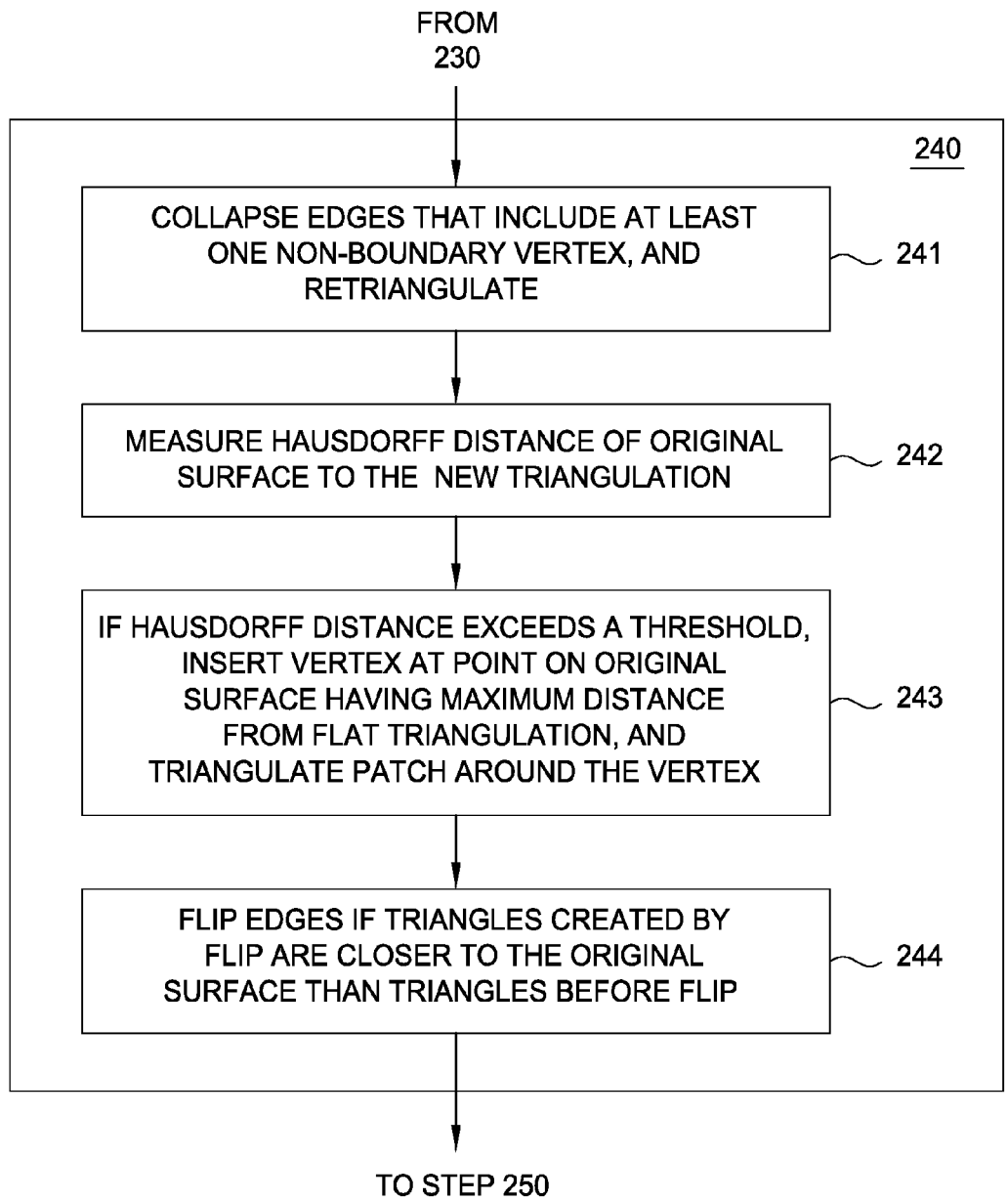
FIG. 5 illustrates yet another one of the steps shown in FIG. 2, according to an embodiment of the invention.

FIG. 5 illustrates yet another step 240 shown in FIG. 2, according to an embodiment. Although approximately developable patches were determined, and their boundaries optimized, such approximately developable patches must still be flattened into 2D. In so doing, the patches may be deformed in a non-isometric fashion, and, further, if the patches are flattened using conformal parameterizations, the resulting 2D shapes may not fit together well in 3D. The decomposition application may avoid these problems by flattening approximately developable patches into truly developable surfaces, and doing so by re-triangulating the patches as ruled surfaces.

For each surface patch, at step 241, the decomposition application collapses edges that include at least one non-boundary vertex until no such internal edges remain, and retriangulates the surface patch. After the collapsing of edges, each edge connects two boundary vertices. As a result, the retriangulated surface patch is developable, and may be developed into the plane by setting the dihedral angle to 0°. This may lead to self-intersections in the plane, which may be resolved by splitting the patches until they no longer intersect.

Cones are developable surfaces of constant slope, and cones can be very far, in terms of Hausdorff distance, from a planar triangulation of their boundary. As a result, at step 242, the decomposition application measures a Hausdorff distance of the original surface to the new triangulation. If the decomposition application determines that the Hausdorff distance exceeds a threshold (i.e., the triangulated surface is cone-like, with the apex of the cone part of the surface patch), then, at step 243, the decomposition application inserts a vertex at a point on the original surface having maximum distance from a flat triangulation (the presumed apex of the cone), and triangulates the patch around the vertex. Doing so still guarantees a developable surface, since a cut may be made along any edge of the triangle fan to obtain a triangulation in which any edge connects two boundary vertices.

At step 244, the decomposition application flips one or more edges if the triangles created by such flips are closer to the original surface than the triangles before the flip. Doing so may further improve the quality of the approximation of the retriangulated surface to the original surface.

Although discussed as automated, user input may be incorporated into the process of flattening approximately developable surfaces into developable surfaces. For example, the user may manually flip and collapse edges in order to improve re-triangulation. As another example, the user may provide a preferred curvature direction for the flattening by drawing a line on a patch. The decomposition application may then take the direction perpendicular to the line drawn to be flat. In one embodiment, the decomposition application may only accept as valid those lines for which reasonably spaced rules (lines perpendicular to the curvature direction) do not intersect inside of the boundary of the surface. The decomposition application may correct a user-drawn curvature line if the line is not valid. In a further embodiment, a user may be permitted to override the cone heuristic used by the decomposition application, and manually determine the cone tip. This may be useful if discretization effects degrade the cone tip.

Figure 6:
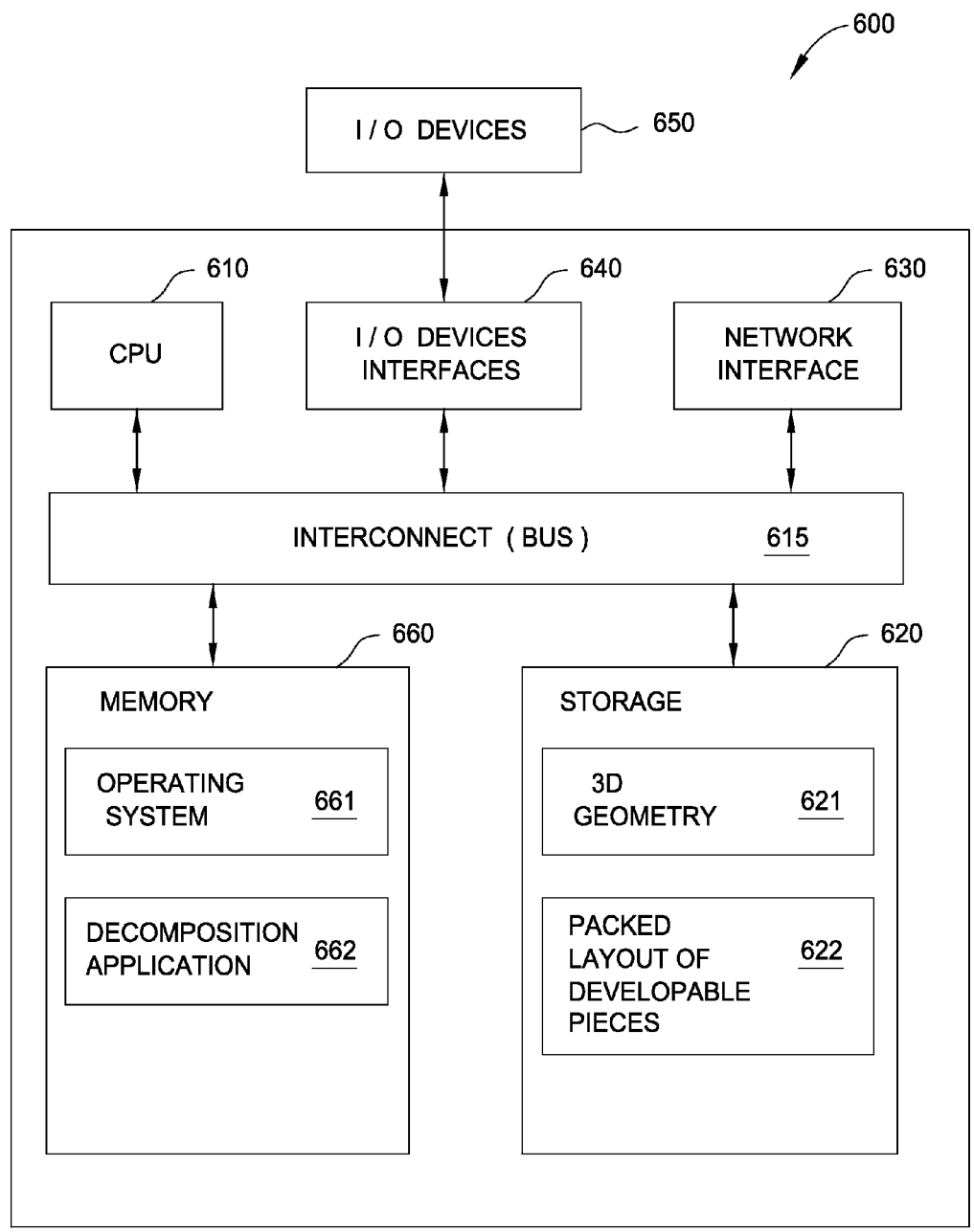
FIG. 6 illustrates a computer system configured to implement one or more aspects of the present invention.

FIG. 6 illustrates a computer system configured to implement one or more embodiments. As shown, the system 600 includes, without limitation, a central processing unit (CPU) 610, a network interface 630, an interconnect 615, a memory 660, and storage 620. The system 600 may also include an I/O device interface 640 connecting I/O devices 650 (e.g., keyboard, display and mouse devices) to the system 600.

The CPU 610 retrieves and executes programming instructions stored in the memory 660. Similarly, the CPU 610 stores and retrieves application data residing in the memory 660. The interconnect 615 facilitates transmission, such as of programming instructions and application data, between the CPU 610, I/O device interface 640, storage 620, network interface 630, and memory 660. CPU 610 is included to be representative of a single CPU, multiple CPUs, a single CPU having multiple processing cores, and the like. And the memory 660 is generally included to be representative of a random access memory. The storage 620 may be a disk drive storage device. Although shown as a single unit, the storage 620 may be a combination of fixed and/or removable storage devices, such as fixed disc drives, floppy disc drives, tape drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 660 includes an operating system 661 and a decomposition application 662. Illustratively, the operating system may include Microsoft's Windows®. The decomposition application 662 is configured to decompose received 3D geometry 621 into developable surface patches and 2D cut patterns. In one embodiment, the nesting application 662 may compute approximately developable surface patches using a variant of k-means clustering, optimize boundaries between the patches, compute piecewise developable approximations to the 3D shape, flatten developable pieces into a planar configuration, and add joinery and generate a packed layout of developable pieces 622, as discussed above with respect to FIGS. 2-5.

Advantageously, embodiments presented herein provide techniques for determining patches on the surface of the 3D shape that are developable. The number of patches need not be specified by a user, who may instead specify only a distance threshold used in growing the patches. The patches may further be flattened, and joinery added, to generate a packed layout of developable pieces, which may then be cut out from physical sheets of material based on the layout. As a result, 3D geometry having arbitrary topology, including open models, may be decomposed into developable pieces that can be assembled together without stress after bending. In addition, techniques disclosed herein permit user intervention at various points, giving the user control over the outcome.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A computer-implemented method for decomposing three-dimensional (3D) geometry into developable surface patches, comprising:
receiving the 3D geometry;
growing, via a processor, surface patches from faces in the 3D geometry until the surface patches become stabilized by:
selecting one or more seed faces, from the faces in the 3D geometry, as initializations of the surface patches, and
up to a distance threshold, iteratively adding faces to the surface patches, wherein, at each iteration, a face with minimum distance to a patch proxy is added to a patch associated with the patch proxy, wherein the patch proxy includes an axis and an opening angle, wherein the surface patches become stabilized when, as a result of a particular iteration, less than a threshold amount of a total area of the faces in the 3D geometry is added to a surface patch or is reassigned to a different surface patch; and
cutting one or more physical sheets of material based on the faces of the surface patches.

2. The method of claim 1, wherein growing surface patches further comprises, merging two patches if no face in the two patches has a distance to a second patch proxy greater than the distance threshold.

3. The method of claim 1, wherein growing surface patches further comprises, if less than a threshold surface area remains unassigned to a patch, removing the distance threshold and growing patches until every face of the 3D geometry is assigned to a patch.

4. The method of claim 1, wherein the distance between a given face and a proxy is measured as a difference between a cosine of the opening angle of the proxy and a dot product of a normal of the given face and the axis of the proxy.

5. The method of claim 1, further comprising, optimizing patch boundaries by:
optimizing an energy by moving boundary points in a data structure which represents the patch boundaries as a set of the boundary points connected with springs; and
remeshing the 3D geometry such that the boundary points are vertices on the 3D geometry.

6. The method of claim 1, further comprising, optimizing patch boundaries by, iteratively:
computing an energy gradient for each of a plurality of contour points;
moving the contour points in directions of negative energy gradients; and
identifying intersections between edges of the 3D geometry and the moved contour,
wherein the contour points lie on either an edge or a vertex of the 3D geometry.

7. The method of claim 1, further comprising, flattening each surface patch into one of the developable surface patches by re-triangulating the surface patch as a ruled surface.

8. The method of claim 7, further comprising,
flattening the developable surface patches into 2D shapes; and
determining a packing of the 2D shapes on a sheet.

9. The method of claim 8, further comprising, removing pieces from a sheet of material based on the packing of the 2D shapes on the virtual sheet.

10. The method of claim 1, wherein the seed faces are user-specified.

11. A non-transitory computer-readable storage medium storing instructions, which when executed by a computer system, perform operations for decomposing three-dimensional (3D) geometry into developable surface patches, the operations comprising:
receiving the 3D geometry;
growing surface patches from faces in the 3D geometry until the surface patches become stabilized by:
selecting one or more seed faces, from the faces in the 3D geometry, as initializations of the surface patches, and
up to a distance threshold, iteratively adding faces to the surface patches, wherein, at each iteration, a face with minimum distance to a patch proxy is added to a patch associated with the patch proxy, wherein the patch proxy includes an axis and an opening angle, wherein the surface patches become stabilized when, as a result of a particular iteration, less than a threshold amount of a total area of the faces in the 3D geometry is added to a surface patch or is reassigned to a different surface patch; and
cutting one or more physical sheets of material based on the faces of the surface patches.

12. The non-transitory computer-readable storage medium of claim 11, wherein growing surface patches further comprises, merging two patches if no face in the two patches has a distance to a second patch proxy greater than the distance threshold.

13. The non-transitory computer-readable storage medium of claim 11, wherein growing surface patches further comprises, if less than a threshold surface area remains unassigned to a patch, removing the distance threshold and growing patches until every face of the 3D geometry is assigned to a patch.

14. The non-transitory computer-readable storage medium of claim 11, wherein the distance between a given face and a proxy is measured as a difference between a cosine of the opening angle of the proxy and a dot product of a normal of the given face and the axis of the proxy.

15. The non-transitory computer-readable storage medium of claim 11, the operations further comprising, optimizing patch boundaries by:

optimizing an energy by moving boundary points in a data structure which represents the patch boundaries as a set of the boundary points connected with springs; and remeshing the 3D geometry such that the boundary points are vertices on the 3D geometry.

16. The non-transitory computer-readable storage medium of claim 11, the operations further comprising, optimizing patch boundaries by, iteratively:

computing an energy gradient for each of a plurality of contour points;

moving the contour points in directions of negative energy gradients; and identifying intersections between edges of the 3D geometry and the moved contour, wherein the contour points lie on either an edge or a vertex of the 3D geometry.

17. The non-transitory computer-readable storage medium of claim 11, the operations further comprising, flattening each surface patch into one of the developable surface patches by re-triangulating the surface patch as a ruled surface.

18. The non-transitory computer-readable storage medium of claim 17, the operations further comprising, flattening the developable surface patches into 2D shapes; and determining a packing of the 2D shapes on a sheet.

19. The non-transitory computer-readable storage medium of claim 18, the operations further comprising, removing pieces from a sheet of material based on the packing of the 2D shapes on the virtual sheet.

20. A system, comprising:

a processor; and a memory, wherein the memory includes an application program configured to perform operations for decomposing three-dimensional (3D) geometry into developable surface patches, the operations comprising:

receiving the 3D geometry, growing surface patches from faces in the 3D geometry until the surface patches become stabilized by:

selecting one or more seed faces, from the faces in the 3D geometry, as initializations of the surface patches; and up to a distance threshold, iteratively adding faces to the surface patches, wherein, at each iteration, a face with minimum distance to a patch proxy is added to a patch associated with the patch proxy, wherein the patch proxy includes an axis and an opening angle, wherein the surface patches become stabilized when, as a result of a particular iteration, less than a threshold amount of a total area of the faces in the 3D geometry is added to a surface patch or is reassigned to a different surface patch, and cutting one or more physical sheets of material based on the faces of the surface patches.

21. The system of claim 20, wherein growing surface patches further comprises, merging two patches if no face in the two patches has a distance to a second patch proxy greater than the distance threshold.

22. The system of claim 20, wherein the distance between a given face and a proxy is measured as a difference between a cosine of the opening angle of the proxy and a dot product of a normal of the given face and the axis of the proxy.

23. The system of claim 20, the operations further comprising:

optimizing an energy by moving boundary points in a data structure which represents the patch boundaries as a set of the boundary points connected with springs; and remeshing the 3D geometry such that the boundary points are vertices on the 3D geometry.

24. The system of claim 20, the operations further comprising:

flattening each surface patch into one of the developable surface patches by re-triangulating the surface patch as a ruled surface;

flattening the developable surface patches into 2D shapes; and determining a packing of the 2D shapes on a sheet.

* * * * *